US010736271B2

(12) United States Patent
Johnson et al.

(10) Patent No.: US 10,736,271 B2
(45) Date of Patent: Aug. 11, 2020

(54) AUTOMATIC PRODUCT FILL METHOD AND CONTROL SYSTEM

(71) Applicant: Deere & Company, Moline, IL (US)

(72) Inventors: Peter A. Johnson, Thibodaux, LA (US); Bryan E. Dugas, Napoleonville, LA (US); John A. Dighton, Thibodaux, LA (US); Rahul Gunda, Pune (IN)

(73) Assignee: DEERE & COMPANY, Moline, IL (US)

( * ) Notice: Subject to any disclaimer, the term of this patent is extended or adjusted under 35 U.S.C. 154(b) by 345 days.

(21) Appl. No.: 15/800,923

(22) Filed: Nov. 1, 2017

(65) Prior Publication Data

US 2019/0124848 A1    May 2, 2019

(51) Int. Cl.
*G06F 7/70* (2006.01)
*G06G 7/00* (2006.01)
*G06G 7/76* (2006.01)
*A01D 90/10* (2006.01)
*A01D 45/10* (2006.01)
*A01D 90/02* (2006.01)
*B60P 1/42* (2006.01)
*G05D 1/00* (2006.01)
*G05D 3/00* (2006.01)
*G06F 7/00* (2006.01)
*G06F 17/00* (2019.01)
*A01D 43/08* (2006.01)

(52) U.S. Cl.
CPC ............ *A01D 90/10* (2013.01); *A01D 45/10* (2013.01); *A01D 90/02* (2013.01); *B60P 1/42* (2013.01); *A01D 43/085* (2013.01); *A01D 43/086* (2013.01)

(58) Field of Classification Search
CPC ........ A01D 90/10; A01D 45/10; A01D 90/02; A01D 43/085; A01D 43/086; B60P 1/42; G06F 7/00
USPC ....................................... 701/50, 2
See application file for complete search history.

(56) References Cited

U.S. PATENT DOCUMENTS

2010/0332051 A1* 12/2010 Kormann ................ A01F 12/46
                                                              701/2
2015/0025754 A1*  1/2015 Krause ................... A01D 57/00
                                                              701/50

(Continued)

FOREIGN PATENT DOCUMENTS

WO       2015/156774      10/2015

*Primary Examiner* — Mahmoud S Ismail
(74) *Attorney, Agent, or Firm* — Michael Best & Friedrich LLP

(57) ABSTRACT

A method of collecting material with a harvester when a storage vehicle is spaced from the harvester includes moving material from the field into the basket, actuating the conveyor for a first time period when the sensed parameter is above the set amount, transporting a first portion of the material a first distance with the actuated conveyor, after the first time period has elapsed, stopping the conveyor to store the first portion of the material on the conveyor, after the first time period has elapsed, if the conveyor can store more material, actuating the conveyor for a second time period, transporting a second portion of the material a second distance with the actuated conveyor and transporting the first portion of the material a third distance with the actuated conveyor, and if the conveyor cannot store more material, alerting an operator that the conveyor is full.

14 Claims, 2 Drawing Sheets

(56) References Cited

U.S. PATENT DOCUMENTS

2017/0049036 A1* 2/2017 Tvetene ................. A01B 76/00
2019/0053427 A1* 2/2019 Matway ............... A01D 43/086

* cited by examiner

AUTOMATIC PRODUCT FILL METHOD AND CONTROL SYSTEM

BACKGROUND

The present disclosure relates to a method of transporting and storing material.

SUMMARY

In one embodiment, the disclosure provides a method of collecting material including a first mode in which a storage vehicle is adjacent a harvester and is positioned to receive materials from the harvester and a second mode in which the storage vehicle is spaced from the harvester and is not positioned to receive material from the harvester. The first mode includes the following steps: moving material from a field into a basket, actuating a conveyor when a sensed parameter is above a set amount, transporting the material from the basket along the actuated conveyor, and depositing the material into the storage vehicle. The second mode including the following steps: moving material from the field into the basket, actuating the conveyor for a first time period when the sensed parameter is above the set amount, transporting a first portion of the material a first distance with the actuated conveyor, after the first time period has elapsed, stopping the conveyor to store the first portion of the material on the conveyor, after the first time period has elapsed, determining if the conveyor can store more material based upon at least one sensed value, if the conveyor can store more material, actuating the conveyor for a second time period, transporting a second portion of the material a second distance with the actuated conveyor and transporting the first portion of the material a third distance with the actuated conveyor, and if the conveyor cannot store more material, alerting an operator that the conveyor is full.

In another embodiment the disclosure provides a method of collecting material with a first vehicle, a transporting device and a second vehicle. The method includes moving material from a first location into a storage location of the first vehicle, sensing if the second vehicle is adjacent the transporting device, sensing at least one parameter to determine if the storage location is above a target fill level, activating the transporting device when the second vehicle is adjacent the transporting device if the sensed parameter indicates that the storage location is above the target fill level, and deactivating the transporting device if the sensed parameter indicates that the storage location is below the target fill level. The method further includes determining, with a controller, if the transporting device can retain additional material when the second vehicle is not adjacent the transporting device, activating the transporting device for a first time period when the second vehicle is not adjacent the transporting device, if the sensed parameter indicates that the storage location is above the target fill level, and if the transporting device can retain additional material, and after the first time period, deactivating the transporting device for a second time period when the second vehicle is not adjacent the transporting device. The method further includes, activating the transporting device for a third time period when the second vehicle is not adjacent the transporting device, if the sensed parameter indicates that the storage location is above the target fill level, and if the transporting device can retain additional material, after the third time period, deactivating the transporting device for a fourth time period when the second vehicle is not adjacent the transporting device, deactivating the transporting device when the sensed parameter indicates that the storage location is below the target fill level, and deactivating the transporting device when the controller determines that the transporting device cannot retain additional material.

In another embodiment the disclosure provides a control system for a vehicle having a first storage container to retain a quantity of material and a conveyor to move the material from the first storage container to a second storage contain separate from the vehicle. The control system includes a controller electrically connected to the conveyor and the first storage container, a first sensor that determines if the first storage container is retaining a quantity of material above a target fill level, the first sensor sends a first signal to the controller when the first storage container is retaining a quantity of material above the target fill level, a second sensor that senses a distance between the conveyor and the second storage container, the second sensor sends a second signal to the controller based upon the sensed distance between the conveyor and the second storage container, and a switch that moves between a first position and a second position in response to the controller, such that, when the sensed distance is less than a set value, the switch moves to the first position and when the sensed distance is greater than the set value, the switch moves to the second position. When the switch is in the first position and the first sensor sends the first signal to the controller, the control system sends a third signal to the conveyor to activate the conveyor. When the switch is in the second position and the first sensor sends the first signal to the controller, the control system sends a fourth signal to activate the conveyor for a first set period of time and subsequently to deactivate the conveyor for a second set time period. When the switch is in either the first or the second position, and when the first signal is not received from the first sensor, the controller sends a fifth signal to deactivate the conveyor.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
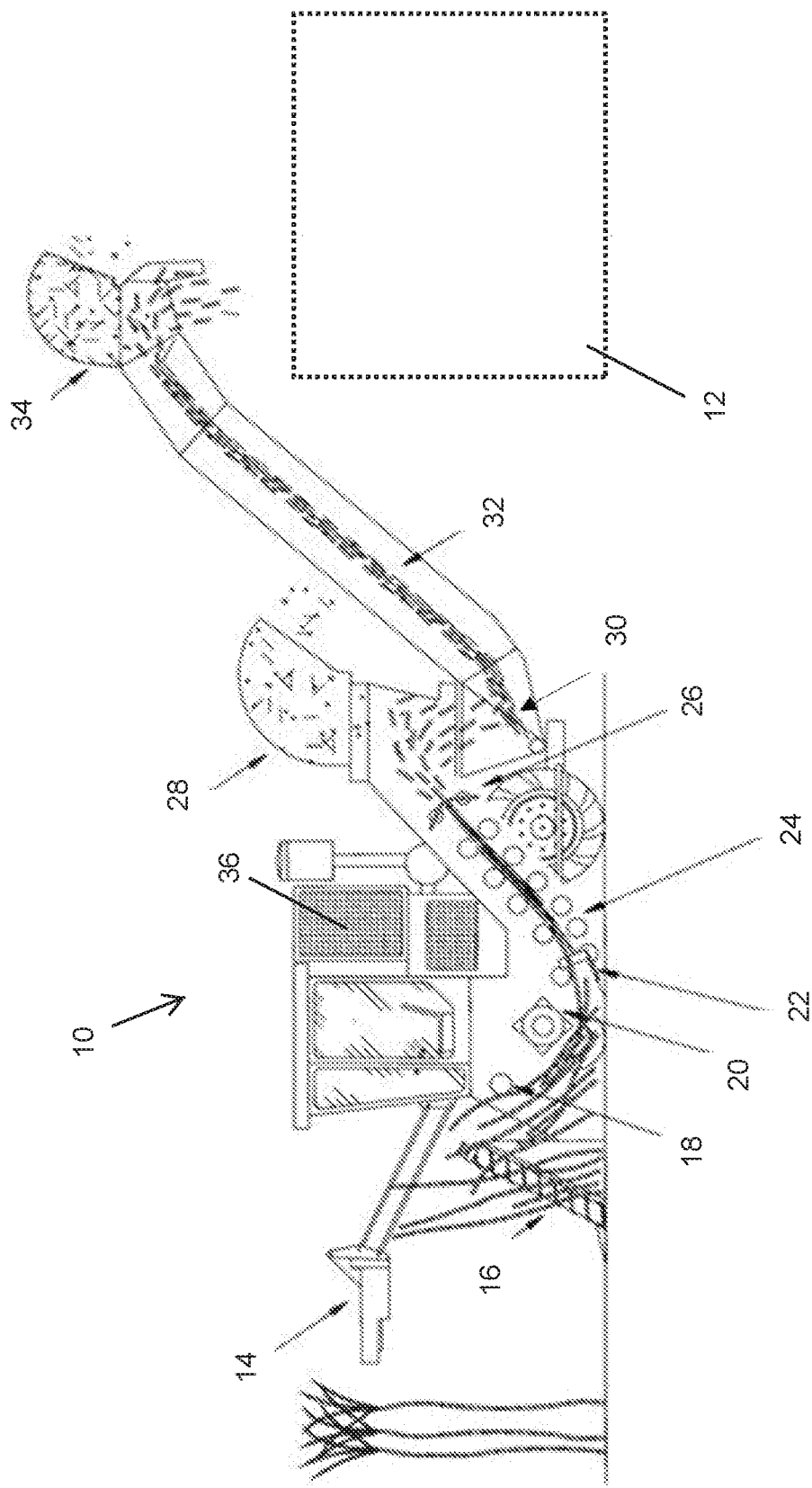
FIG. 1 is a side view of a harvester and a storage vehicle.

FIG. 1 illustrates a sugar cane harvester 10 for harvesting sugar cane and a vessel 12 for retaining the harvested sugar cane. The illustrated harvester 10 includes a topper 14, a crop divider 16, a knockdown roller 18, a fin roller 20, a base cutter 22, feed rollers 24, a chopper 26, a basket 28, a primary extractor 30, a transporter 32, a secondary extractor 34 and a control system 36. In some embodiments, other harvesters can be utilized in place of the illustrated sugar cane harvester 10. In still other embodiments, any conveyor structure for transporting loose material, such as mining which moves loose rocks, can be utilized in place of the illustrated sugar cane harvester 10.

The topper 14 cuts leaves off of the top of the crops. The crop divider 16 divides the crops into separate rows to prevent uprooting of the crops. The knockdown roller 18 pushed the crop forward so that the base cutter 22 cuts the crops at the ground level. The fin roller 20 feeds crops into the base cutter 22. The feed rollers 24 rotate to move the cut crops through the chopper 26 to be cut into shorter lengths.

The basket 28 is positioned to receive the cut crops from the chopper 26 and to retain the cut crops. The primary extractor 30 includes a fan to move leaves out of a hood such that the leaves are not directed into the basket 28.

The illustrated transporter 32 is a conveyor that moves crops from the basket and into the vessel 12. In some embodiments, the transporter 32 is a conveyor that includes a plurality of slats to move crops up the conveyor. In some embodiments, the transporter 32 is an elevator, whereas in other embodiments, the transporter 32 is an auger. The secondary extractor 34 includes a fan to move any remaining leaves out of a hood such that the leaves are not directed into the vessel 12. The control system 36 senses various parameters and controls operation of all of the components of the harvester 10.

In some embodiments the vessel 12 is coupled to a vehicle that is operable to move alongside the harvester 10. When the vessel 12 is full, as measured by one or more sensors, the vessel 12 is transported to a separate location to be weighed and unloaded. Then, a different vessel 12 is positioned adjacent the harvester 10 to receive harvested crop from the harvester 10.

Figure 2:
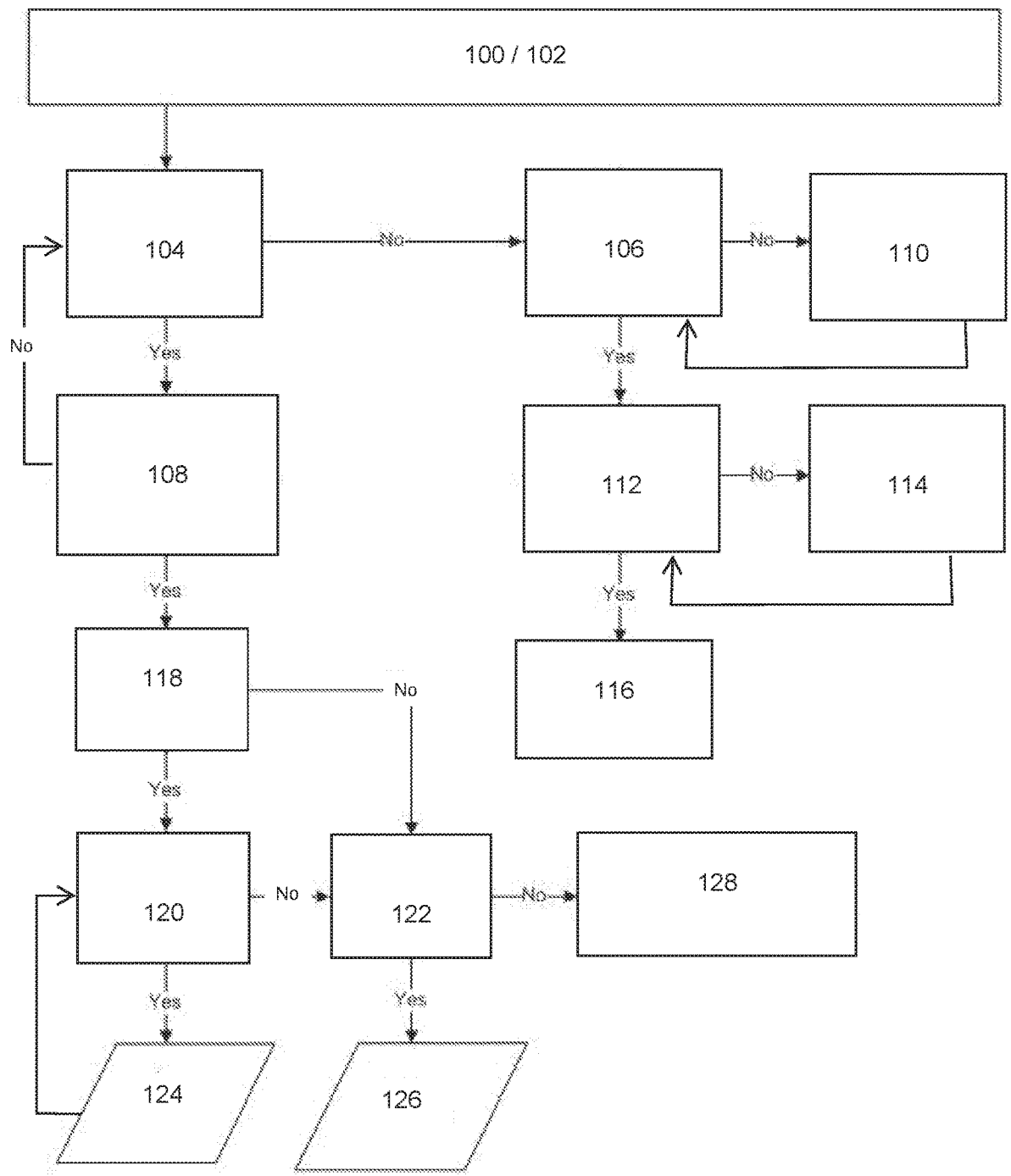
FIG. 2 is a flow chart illustrating one possible mode of operation of the harvester and storage vehicle of FIG. 1.

Operation of the harvester 10 is shown in FIG. 2 in which the fill rate of the basket 28 is estimated at step 100. The fill rate of the basket 28 can be estimated by sensing a pressure in the chopper 26, by sensing a weight of the basket 28 over time in conjunction with emptying of the basket 28 onto the transporter 32, or by other suitable methods.

At step 102, the location of crop along the length of the transporter 32 is estimated to determine the portion of the transporter 32 that includes crops. The crop location in the transporter 32 can be estimated by monitoring the duration of operation and the speed of operation of the transporter 32. The crop location may indicate that the transporter 32 is full of crops or may indicate that a portion of the transporter 32 is empty and can hold more crops.

At step 104, the control system 36 determines if the basket 28 is being filled with crops. If the basket 28 is not being filled with crops, the operation moves to step 106, whereas if the basket 28 is being filled with crops, the operation moves to step 108. At step 106, the control system 36 determines if the basket 28 is empty. If the basket 28 is not empty, operation moves to step 110 at which operation of the transporter 32 is continued. If the basket 28 is empty, operation moves to step 112 at which the control system 36 determine if the transporter 32 is empty. If the transporter 32 is not empty, operation moves to step 114 at which operation of the transporter 32 is continued. If the transporter 32 is empty, operation moves to step 116 at which the transporter 32 is stopped.

When the basket 28 is being filled with crops at step 108, the control system 36 determines if the basket 28 has reached a target fill level. If the basket 28 has not reached the target fill level, operation returns to step 104. The target fill level can be set by an operator and can be compared to the estimated fill level of the basket 28. The fill level of the basket 28 can be measured directly or estimated with indirect measurement.

Some possible indirect measurement methods include: detecting an accumulated crop flow with a measured pressure from the knockdown roller 18, the fin roller 20, the base cutter 22, the feed rollers 24 and/or the chopper 26; a mechanical switch or armature plate positioned to detect crop flow through the feed rollers 24 and/or the chopper 26; and any of a number of non-mechanical sensors (such as stereo vision, mono vision, radar, LIDAR, ultrasound, etc.) positioned adjacent any of the knockdown roller 18, the fin roller 20, the base cutter 22, the feed rollers 24 and/or the chopper 26.

Some possible direct measurement method includes: using a pressure plate positioned below or inside the basket 28; using a mechanical arm or switch to determine when a crop level inside the basket 28 reaches a set level; and using one or more non-mechanical sensors (such as stereo vision, mono vision, radar, LIDAR, ultrasound, etc.) to determine the fill level of the basket 28.

If the basket 28 has reached the target fill level, operation moves to step 118 at which the control system 36 determines if the harvester 10 should operate in a second mode (mode 2). A harvester 10 can operate in the second mode if no vessel 12 is configured to receive crops from the transporter 32. As an example, there may be a brief time when there is no vessel 12 adjacent the harvester 10 when a filled vessel 12 departs and prior to the arrival of a replacement vessel 12. Further, at the start of a new row, there is often a period of time in which the vessel 12 is spaced from the harvester 10. During any of the occasions in which the vessel 12 is spaced from the harvester 10, the control system 36 can operate in mode 2. If the control system 36 does not sense a vessel 12 that is configured to receive crops from the transporter 32, operation moves to step 120.

At step 120, the control system 36 is operating in mode 2 and the control system 36 determines if the transporter 32 can hold more crops or if the transporter 32 is full. The control system 36 can utilize the nominal conveyor travel speed, conveyor unloading capacity, conveyor state and estimated basket load to infer or determine if the transporter 32 is full or can hold more crops. For example, the crop position in the transporter 32 can be estimated by measuring one or more of the following parameters: the nominal speed of the transporter 32, the duration of time in which the transporter 32 is activated, and the capacity of the transporter 32 to remove crops from the basket 28 per second when the conveyor is activated. The parameters are measured and compared to the target basket level set by the operator (for example, in percent per mass per volume). The comparison of the target basket level and the measured parameters are used by the control system 36 to determine if the transporter 32 can hold more crops.

If the transporter 32 can hold more crops, operation moves to step 124. Step 124 operates the transporter 32 for a set time period. For example, the transporter 32 can operate or jog for 2 seconds and then stop. This intermittent operation can be used to pre-load the transporter 32 with crops when the vessel 12 is not available. The transporter 32 is stopped after the set time period (for example, 2 seconds) to prevent crops from moving along the entire length of the transporter 32 and falling to the ground. Operation returns to step 120 at which the control system 36 determines if the transporter 32 can hold more crops. If the transporter 32 can hold more crops, operation moves again to step 124 which operates the transporter 32 for a set time period (for example, 2 seconds) before stopping the transporter 32. In some embodiments, the transporter 32 is jogged on for about 1 second, and jogged off for about 1 second. This cycle can be repeated any number of times, but in some embodiments, is repeated 5 to 10 times. The operator can set the time period that the transporter 32 is set to operate during mode 2 based upon a variety of factors (such as, the length of the conveyor, the fill level of the basket, the distance between any slats on the transporter 32, etc.).

If the transporter 32 cannot hold more crops, operation moves to step 122. If the control system 36 determines that the harvester 10 should not operate in the second mode at step 118, the control system 36 moves to step 122. At step 122, the control system 36 determines if the control system 36 should operate in the first mode because the control system 36 senses a vessel 12 in position to receive crops. If the control system determines that a vessel 12 in in position to receive crops, the transporter 32 is started at step 126. If the control system 36 determines that a vessel 12 is not in position to receive crops, the operator is alerted that the basket 28 is full at step 128.

Various features and advantages of the disclosure are set forth in the following claims.

What is claimed is:

1. A control system for a vehicle having a first storage container operable to retain a quantity of material and a conveyor operable to move the material from the first storage container to a second storage contain separate from the vehicle, the control system comprising:
a controller electrically coupled to the conveyor and the first storage container;
a first sensor operable to determine if the first storage container is retaining a quantity of material above a target fill level, the first sensor configured to send a first signal to the controller when the first storage container is retaining a quantity of material above the target fill level;
a second sensor operable to sense a distance between the conveyor and the second storage container, the second sensor configured to send a second signal to the controller based upon the sensed distance between the conveyor and the second storage container;
a switch operable to move between a first position and a second position in response to the controller, such that, when the sensed distance is less than a set value, the switch is operable to move to the first position and when the sensed distance is greater than the set value, the switch is operable to move to the second position;
wherein when the switch is in the first position and the first sensor sends the first signal to the controller, the control system is operable to send a third signal to the conveyor to activate the conveyor,
wherein when the switch is in the second position and the first sensor sends the first signal to the controller, the control system is operable to send a fourth signal to activate the conveyor for a first set period of time and subsequently to deactivate the conveyor for a second set time period, and
wherein, when the switch is in either the first or the second position, and when the first signal is not received from the first sensor, the controller is operable to send a fifth signal to deactivate the conveyor.

2. The control system of claim 1, wherein during the second time period, the first storage container configured to accrue material while the conveyor is stopped.

3. The control system of claim 1, wherein when the fourth signal is sent to activate the conveyor, one of a plurality of slots of the conveyor is filled as the one of the plurality of slots moves past the first storage container during the first time period to transport a first portion of the material in a first one of the plurality of slots during the first time period.

4. The control system of claim 3, wherein, after the first time period and the second time period have elapsed, when the switch is in the second position and the first sensor sends the first signal to the controller, the control system is operable to send a sixth signal to activate the conveyor for a third period of time to move a second one of the plurality of slots past the basket during the third time period to transport a second portion of the material in a second one of the plurality of slots, and to transport the first portion of the material in the first one of the plurality of slots during the third time period and subsequently to deactivate the conveyor for a fourth set time period.

5. The control system of claim 4, wherein the control system is configured to direct movement of the conveyor to thereby fill a plurality of the plurality of slots with respective portions of the material such that a majority of a length of the conveyor includes slots having respective portions of the material supported thereon.

6. The control system of claim 5, wherein the control system is operable to alert the operator when a set amount of the slots include respective portions of the material and to stop the conveyor when the set amount of the slots include respective portions of the material.

7. The control system of claim 1, wherein the control system is operable to stop the conveyor when the first signal is received such that material is accrued in the storage location in the first vehicle while the conveyor is stopped.

8. The control system of claim 1, wherein during first time period, the conveyor is configured to move a first portion of the material a first distance with the transporting device prior to deactivating the transporting device.

9. The control system of claim 1, wherein the first sensor is a pressure sensor configured to sense a pressure in a chopper, the chopper positioned upstream of the first storage container.

10. The control system of claim 1, wherein when the switch is in the second position, the controller is configured to determine a quantity of available slots on the conveyor configured to retain material, and is configured to send the fourth signal to the controller a set amount of times, the set amount of times corresponding to the determined quantity of available slots.

11. The control system of claim 1, wherein the control system is operable to alert the operator when a set amount of the slots include respective portions of the material and to stop the transporting device when the set amount of the slots include respective portions of the material.

12. The control system of claim 9, wherein when the switch is in the second position, the controller is configured to determine a quantity of available slots on the conveyor configured to retain material, and is configured to send the fourth signal to the controller a set amount of times, the set amount of times corresponding to the determined quantity of available slots.

13. The control system of claim 12, wherein the control system is operable to alert the operator when a set amount of the slots include respective portions of the material and to stop the transporting device when the set amount of the slots include respective portions of the material.

14. The control system of claim 9, wherein the control system is operable to alert the operator when a set amount of the slots include respective portions of the material and to stop the transporting device when the set amount of the slots include respective portions of the material.

* * * * *